United States Patent
Madabhushi et al.

(10) Patent No.: US 9,286,672 B2
(45) Date of Patent: Mar. 15, 2016

(54) INTEGRATED MULTIVARIATE IMAGE-BASED METHOD FOR DISEASE OUTCOME PREDICITION

(71) Applicant: Rutgers, The State University of New Jersey, New Brunswick, NJ (US)

(72) Inventors: Anant Madabhushi, South Plainfield, NJ (US); Ajay Basavanhally, Skillman, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 0 days.

(21) Appl. No.: 13/983,280

(22) PCT Filed: Oct. 12, 2012

(86) PCT No.: PCT/US2012/060002
§ 371 (c)(1),
(2) Date: Aug. 1, 2013

(87) PCT Pub. No.: WO2013/106116
PCT Pub. Date: Jul. 18, 2013

(65) Prior Publication Data
US 2014/0314286 A1    Oct. 23, 2014

Related U.S. Application Data

(63) Continuation of application No. PCT/US2012/020821, filed on Jan. 12, 2012.

(51) Int. Cl.
G06T 7/00    (2006.01)
G06K 9/00    (2006.01)
G06K 9/46    (2006.01)
G06K 9/62    (2006.01)

(52) U.S. Cl.
CPC .......... *G06T 7/0012* (2013.01); *G06K 9/00147* (2013.01); *G06K 9/469* (2013.01); *G06K 9/6292* (2013.01); *G06T 2207/20016* (2013.01); *G06T 2207/20072* (2013.01); *G06T 2207/20081* (2013.01); *G06T 2207/30024* (2013.01)

(58) Field of Classification Search
None
See application file for complete search history.

(56) References Cited

U.S. PATENT DOCUMENTS

| 6,165,734 A | 12/2000 | Garini et al. |
| 2003/0174873 A1 | 9/2003 | Giger et al. |
| 2008/0069445 A1 | 3/2008 | Weber |
| 2008/0082468 A1* | 4/2008 | Long et al. .................. 706/12 |

(Continued)

FOREIGN PATENT DOCUMENTS

| WO | 2010/027476 A1 | 3/2010 |
| WO | 2010/088672    | 8/2010 |

(Continued)

OTHER PUBLICATIONS

Intenational Search Report for PCT/US2012/060002, dated Jan. 24, 2013.

(Continued)

*Primary Examiner* — Tsung-Yin Tsai
(74) *Attorney, Agent, or Firm* — Fox Rothschild LLP

(57) ABSTRACT

The described invention provides a system and method for predicting disease outcome using a multi-field-of-view scheme based on image-based features from multi-parametric heterogenous images.

20 Claims, 6 Drawing Sheets

(56) References Cited

U.S. PATENT DOCUMENTS

| | | | |
|---|---|---|---|
| 2008/0118124 | A1 | 5/2008 | Madabhushi et al. |
| 2008/0292194 | A1* | 11/2008 | Schmidt et al. ............... 382/217 |
| 2010/0098306 | A1 | 4/2010 | Madabhushi et al. |
| 2010/0111396 | A1* | 5/2010 | Boucheron ................... 382/133 |
| 2010/0169024 | A1 | 7/2010 | Madabhushi et al. |
| 2010/0266179 | A1 | 10/2010 | Ramsay et al. |
| 2010/0329529 | A1 | 12/2010 | Feldman et al. |
| 2011/0255741 | A1 | 10/2011 | Jung et al. |
| 2011/0289043 | A1 | 11/2011 | Suresh et al. |
| 2012/0106821 | A1 | 5/2012 | Madabhushi et al. |
| 2014/0037172 | A1 | 2/2014 | Madabhushi et al. |
| 2014/0064581 | A1* | 3/2014 | Madabhushi et al. ........ 382/128 |
| 2014/0180977 | A1 | 6/2014 | Cosatto et al. |
| 2014/0200433 | A1 | 7/2014 | Choi et al. |
| 2014/0314286 | A1 | 10/2014 | Madabhushi et al. |

FOREIGN PATENT DOCUMENTS

| | | |
|---|---|---|
| WO | 2011/005570 | 1/2011 |
| WO | 2011/044513 | 4/2011 |

OTHER PUBLICATIONS

Basavanhally et al., "A boosted classifier for integrating multiple fields of view: Breast cancer grading in histopathology," Biomedical Imaging: From Nano to Macro, 2011 IEEE International Symposium, (2011), pp. 125-127 (Abstract only).

Bloom et al, "Histological grading and prognosis in breast cancer; a study of 1409 cases of which 359 have been followed for 15 years." Br. J. Cancer, (Sep. 1957) vol. 11, Issue 3, pp. 359-377.

Breiman, L., "Random forests," Machine Learning, (2001) vol. 45, pp. 5-32 (Abstract only).

Doyle et al., "Automated grading of prostate cancer using architectural and textural image features," In Proc. 4th IEEE Int. Symp. Biomedical Imaging: From Nano to Macro ISBI, pp. 1284-1287 (Abstract only).

Doyle et al., "Detecting prostatic adenocarcinoma from digitized histology using a multi-scale hierarchial classification approach," IEEE EMBS, (2006) vol. 1, pp. 4759-4762 (Abstract only).

Duda et al., "Pattern Classification," John Wiley & Sons (2001) (Book description only).

Erovic et al., "Quantitation of micro vessel density in squamous cell carcinoma of the head and neck by computer-aided image analysis," Wien Klin Wochenschr, (Jan. 2005) vol. 117, Issue 1-2, pp. 53-57 (Abstract only).

Madabhushi, "Quanititative Integration of Radiology, Pathology and Omics Data: Methods and Use Cases," Laboratory for Computational Imagin & Bioinformatics, (2011).

Nassif et al., "Immunohistochemistry expression of tumor markers CD34 and P27 as a prognostic factor of clinically localized prostate adenocarcinoma after radical prostatectomy.", Rev. Col. Bras. Cir., (Oct. 2010) vol. 37, Issue 5, pp. 338-344.

Paik et al., "A Multigene Assay to Predict Recurrence of Tamoxifen-Treated, Node-Negative Breast Cancer." N. Engl. J. Med., (Dec. 2004) vol., 351, Issue 27, pp. 2817-2826.

Ruifrok et al., "Quantification of histochemical staining by color deconvolution," Anal. Quant. Cytol. Histol., (Aug. 2001) vol. 23, Issue 4, pp. 291-299 (Abstract only).

Sertel et al., "Computer-aided Prognosis of Neuroblastoma on Whole-slide Images: Classification of Stromal Development," Pattern Recognit., (Jun. 2000) vol. 42, Issue 6, pp. 1093-1103.

Sudbø et al., "Prognostic Value of Graph Theory-Based Tissue Architecture Analysis in Carcinomas of the Tongue.", Lab. Invest., (Dec. 2000) vol. 80, Issue 12, pp. 1881-1889.

Torres L. et al., "Intratumor genomic heterogeneity in breast cancer with clonal divergence between primary carcinomas and lymph node metastases", Breast Cancer Res. Treat., (Apr. 2007) vol. 102, Issue 2, pp. 143-155 (Abstract only).

Weidner et al., "Tumor angiogenesis and metastasis-correlation in invasive breast carcinoma.", N. Engl. J. Med., (Jan. 1991) vol. 324, Issue 1, pp. 1-8.

Weigelt et al., "Molecular profiling currently offers no more than tumor morphology and basic immunohistochemistry." Br. Can. Res., (2010) vol. 12(Suppl 4):S5.

Basavanhally et al.: "Computerized Image-Based Detection and Grading of Lymphocytic Infiltration in HER2+ Breast Cancer Histopathology", IEEE, Mar. 2010, vol. 57, No. 3, pp. 642-653.

Basavanhally et al.: "Computer-Aided Prognosis of ER+ Breast Cancer Histopathology and Correlating Survival Outcome With Oncotype DX Assay", IEEE, ISBI 2009, pp. 851-854.

Doyle et al.: "Consensus of Ambiguity: Theory and Application of Active Learning for Biomedical Image Analysis", PRIB 2010, pp. 313-324.

Kong et al.: "Computer-Aided Grading of Neuroblastic Differentiation: Multi-Resolution and Multi-Classifier Approach", IEEE ICIP 2007, pp. 525-528.

Petushi et al.: "Large-Scale Computations on Histology Images Reveal Grade-Differentiating Parameters for Breast Cancer", BMC Medical Imaging 2006, vol. 6, No. 14, pp. 1-11.

* cited by examiner

INTEGRATED MULTIVARIATE IMAGE-BASED METHOD FOR DISEASE OUTCOME PREDICITION

CROSS-REFERENCE TO RELATED APPLICATIONS

This application is the U.S. National Phase of International Patent Application Serial No. PCT/US12/60002. filed Oct. 12, 2011 which claims priority to International Patent Application Serial No. PCT/US12/20821 filed Jan. 12, 2012, the entire disclosure of which is incorporated herein by reference.

STATEMENT OF GOVERNMENT FUNDING

The described invention was made with government support under Grant No. NIH R43CA159704-01 from the National Institutes of Health. The government has certain rights in the invention.

FIELD OF THE INVENTION

The described invention relates to methods of prediction of aggressiveness and outcome of cancer.

BACKGROUND

Current methodologies for identification of many diseased states rely on manual visual interpretations of fixed histological samples from target tissues. Such methodologies include, but are not limited to, microscopic image analysis of tumor morphology as well as immunohistochemistry that help disease state classification. Prediction of disease aggressiveness and outcome facilitate selective employment of better therapeutic options. For example, in case of estrogen receptor-positive (ER+) breast cancer (BCa) patients, identifying which patients will benefit from adjuvant chemotherapy over standard hormonal therapy would help limit the use of chemotherapy to more aggressive forms of breast cancer.

Recent advances in genomics and proteomics have led to improvements in diagnostic and prognostic methods utilizing changes in patterns of gene and protein expression profiles. For example, prognosis and treatment of early stage ER+BCa are often guided by the Oncotype DX™ genomic assay (Genomic Health, Inc.), which ascertains a Recurrence Score (RS) correlated with likelihood of recurrence. (Paik, S. et al., "A multigene assay to predict recurrence of tamoxifen-treated, node-negative breast cancer." N. Engl. J. Med., December 2004, 351(27): 2817-2826). WO 2011/044513 ("Diagnostic and Prognostic Markers of Cancer") describes a method for determining risk of recurrent breast cancer and WO 2011/005570 ("Systems and methods for treating, diagnosing and predicting the response to therapy of breast cancer") describes methods of assessing the aggressiveness of breast cancer in a subject and for determining whether a patient will derive benefit from a given treatment regimen, as measured by protein expression levels of specific biomarkers for breast cancer. However, such molecular-based assays may have limited value in accomplishing any additional predictive power over standard histological analyses of disease tissue samples, for example, in ascertaining grading and target receptor status in breast cancer patients. (Weigelt, B. and Reis-Filho, J. S., "Molecular profiling currently offers no more than tumor morphology and basic immunohistochemistry." Br. Can. Res., 2010, 12(Suppl 4):S5).

Visual analysis of tumor grade in BCa histopathology has shown significant value in predicting patient outcome. (Bloom, H. J. et al., "Histological grading and prognosis in breast cancer; a study of 1409 cases of which 359 have been followed for 15 years." Br. J. Cancer, September 1957, 11(3): 359-377). Nevertheless, such methods require specialized equipment, significant time to obtain results, are expensive, and the results obtained may have limited reproducibility due to high inter- and intra-clinician variability.

Manual image analysis techniques entail implicit partitioning of an entire histopathology slide into many fields-of-view (FOVs) and incorporating image features from each FOV to arrive at a diagnostic decision for the entire slide. Computerized approaches to whole-slide classification involve extraction of image features for purposes of training of a classifier from within empirically selected FOVs. (Sertel, O. et al., "Computer-aided prognosis of neuroblastoma on whole-slide images: Classification of stromal development.", Pattern Recognit., June 2000, 42(6): 1093-1103, 7). The empirical selection of FOVs for computerized analysis of histopathology slides presents two main concerns. First, it is a subjective and time-consuming task that requires manual intervention by an expert, an issue that would impede the development of a truly automated classification system. Second, many diseases such as BCa, are known to contain intratumoral heterogeneity (Torres, L. et al., "Intratumor genomic heterogeneity in breast cancer with clonal divergence between primary carcinomas and lymph node metastases", Breast Cancer Res. Treat., April 2007, 102(2):143-155). Thus, different types of cancer (e.g. ductal carcinoma in situ and invasive ductal cancer) and levels of malignancy (e.g. low and intermediate grades) may be present in a single histopathology slide, giving rise to irreproducibility of results. For example, the CD34 protein is a popular indicator of angiogenesis and, hence, tumor growth and metastasis (Weidner, N. et al., "Tumor angiogenesis and metastasis-correlation in invasive breast carcinoma.", N. Engl. J. Med., January 1991, 324(1):1-8). Previously, both qualitative and quantitative assessments of immunohistochemically (IHC) stained slides with CD34 have characterized IHC staining via "hotspots", i.e. manually selected FOVs. (Nassif, A. E. et al., "Immunohistochemistry expression of tumor markers cd34 and p27 as a prognostic factor of clinically localized prostate adenocarcinoma after radical prostatectomy.", Rev. Col. Bras. Cir., October 2010, 37(5): 338-344; Erovic, B. M. et al., "Quantitation of microvessel density in squamous cell carcinoma of the head and neck by computer-aided image analysis.", Wien Klin Wochenschr, January 2005, 117(1-2): 53-57). The pitfalls associated with manual FOV selection suggest that hotspot-based predictions may not accurately represent CD34 expression in an entire slide.

Due to the high degree of heterogeneity in cancer, it is important to locate regions of interest in histopathology that are representative of the tumor as a whole. Traditional image processing involves the use of multi-scale, i.e., multi-resolution methods to extract contextual information at varying scales of a single FOV of a given image. (Doyle, S. et al., "Detecting prostatic adenocarcinoma from digitized histology using a multi-scale hierarchial classification approach.", IEEE EMBS, 2006, 1: 4759-4762). Such multi-scale methods are useful for analysis of large images since texture provides different types of information at different resolutions. However, in such methods, object density remains invariant to changes in scale, although our visual perception and ability to detect individual objects within the image may vary. This presents technical challenges in analyzing local object density (or other localized descriptors).

The present invention circumvents the need for determining an optimal FOV size by calculating image features at multiple FOV sizes. The present invention provides methods for integrating image-based multi-parametric information from differently stained histopathology slides by using multi-field of view framework.

SUMMARY

According to one aspect, the described invention provides a method for analyzing a heterogenous image, using a multi-field-of-view (FOV) multi-parametric scheme, the method comprising: (a) inputting, via a computing device, a large heterogenous image; (b) generating, via the computing device, a plurality of FOVs at a first fixed FOV size from among a plurality of fixed FOV sizes; (c) producing, via the computing device, an aggregated multi-FOV decision for the large heterogenous image based on a first image parameter from among a plurality of image parameters, comprising: (i) producing a combined class decision for each of the plurality of FOVs at the first fixed FOV size based on the first image parameter, comprising: (1) extracting, via the computing device, the first image parameter describing a spatial arrangement of at least one object from each FOV at the first fixed FOV size; (2) training, via the computing device, a first classifier from among a plurality of classifiers identifying the first image parameter describing the spatial arrangement of the at least one object from each FOV at the first fixed FOV size; (3) making, via the computing device, a first class decision for each FOV at the first fixed FOV size using a classification ensemble based on the first image parameter; (4) combining, via the computing device, the first class decisions for each of the plurality of FOVs at the first fixed FOV size to yield the combined class decision for the plurality of FOVs at the first fixed FOV size; and (5) producing, via the computing device, the combined class decision for each of the plurality of FOVs at the first fixed FOV size based on the first image parameter; (ii) repeating, via the computing device, the steps of extracting, training, making and combining for each of the plurality of fixed FOV sizes to generate a plurality of combined class decisions at respective ones of the plurality of fixed FOV sizes based on the first image parameter; (iii) aggregating, via the computing device, the plurality of combined class decisions at the respective ones of the plurality of fixed FOV sizes based on the first image parameter to yield an aggregated multi-FOV decision, using a first multi-FOV classifier from among a plurality of multi-FOV classifiers, wherein the first multi-FOV classifier aggregates the plurality of combined class decisions that are outputs of the ensembles at each of the plurality of fixed FOV sizes based on the first image parameter; and (iv) producing the aggregated multi-FOV decision for the large heterogenous image based on the first image parameter.

According to one embodiment of the method, the described method further comprises: (d) producing an aggregated decision for the large heterogenous image based on a second image parameter from among the plurality of image parameters, comprising: (i) producing a combined class decision for the plurality of FOVs at the first fixed FOV size based on the second image parameter, comprising: (1) extracting, via the computing device, the second image parameter describing a spatial arrangement of at least one object from each FOV at the first fixed FOV size; (2) training, via the computing device, a first classifier from among a plurality of classifiers, identifying the second image parameter that best describes the spatial arrangement for each FOV at the first fixed FOV size; (3) making, via the computing device, a second class decision for each FOV at the first fixed FOV size using a classification ensemble based on the second image parameter; (4) combining, via the computing device, the second class decisions for each of the plurality of FOVs at the first fixed FOV size to yield a combined class decision for the plurality of FOVs at the first fixed FOV size; and (5) producing, via the computing device, the combined class decision for each of the plurality of FOVs at the first fixed FOV size based on the second image parameter; (ii) repeating, via the computing device, the steps of extracting, training, making and combining for each of the plurality of FOV sizes to generate a plurality of combined class decisions at each of the plurality of fixed FOV sizes based on the second image parameter; (iii) aggregating, via the computing device, the plurality of combined class decisions at the respective ones of the plurality of fixed FOV sizes based on the second image parameter to yield an aggregated multi-FOV decision, using a first multi-FOV classifier from among a plurality of multi-FOV classifiers, wherein the second multi-FOV classifier aggregates the plurality of the combined class decisions that are outputs of the ensembles at each of the plurality of fixed FOV sizes based on the second image parameter; and (iv) producing the aggregated multi-FOV decision for the large heterogenous image based on the second image parameter; (e) producing, via the computing device, a plurality of aggregated multi-FOV decisions for the large heterogenous image based on the plurality of image parameters using a plurality of multi-FOV classifiers; (f) integrating, via the computing device, the aggregated multi-FOV decisions of steps (c), (d) or (e) to generate an integrated multi-parametric decision for the heterogenous image; using a multi-parametric classifier, wherein the multi-parametric classifier integrates the plurality of aggregated multi-FOV decisions that are outputs of the ensembles based on each of the plurality of image parameters, and (g) producing, via the computing device, the integrated multi-parametric decision for the heterogenous image.

According to one embodiment, the heterogenous image is a microscopic image. According to one embodiment, the heterogenous image is a histopathologic image. According to one embodiment, the heterogenous image is a diseased tissue. According to one embodiment, the diseased tissue is selected from the group consisting of a cancer, an inflammatory disease, Crohn's disease, rheumatoid arthritis, microbial infections, and a combination thereof. According to one embodiment, the cancer is selected from the group consisting of a prostate cancer, a breast cancer, a pancreatic cancer, a colon cancer, a leukemia, a lymphoma, a myeloma, an ovarian cancer, a melanoma, a lung cancer, a glioma, a renal-cell cancer, and a combination thereof. According to one embodiment, the cancer is a breast cancer. According to one embodiment, the breast cancer is characterized by at least one immunohistochemical (IHC) marker selected from the group consisting of estrogen receptor (ER), progesterone receptor (PR), HER2, CA 15-3, CA 27.29, CEA, ER, PgR, uPA, PAI-1, Ki-67, and a combination thereof. According to one embodiment, the multi-FOV multi-parametric scheme obviates the need for a prior determination of optimal FOV size.

According to another aspect, the described invention provides a system for analyzing a heterogenous image, using a multi-field-of-view (FOV) multi-parametric scheme via a computing device, comprising: (a) a computing device configured to input an image; (b) the computing device configured to generate a plurality of FOVs at a first fixed FOV size from among a plurality of fixed FOV sizes; (c) the computing device configured to produce an aggregated multi-FOV decision for the large heterogenous image based on a first image parameter from among a plurality of image parameters, comprising: (i) the computing device configured to produce a combined class decision for each of the plurality of FOVs at the first fixed FOV size based on the first image parameter, comprising: (1) the computing device configured to extract the first image parameter describing a spatial arrangement of at least one object from each FOV at the first fixed FOV size; (2) the computing device configured to train a first classifier from among a plurality of classifiers identifying the first image parameter describing the spatial arrangement of the at least one object from each FOV at the first fixed FOV size; (3) the computing device configured to make a first class decision for each FOV at the first fixed FOV size using a classification ensemble based on the first image parameter; (4) the computing device configured to combine the first class decisions for each of the plurality of FOVs at the first fixed FOV size to yield the combined class decision for the plurality of FOVs at the first fixed FOV size; and (5) the computing device configured to produce the combined class decision for each of the plurality of FOVs at the first fixed FOV size based on the first image parameter; (ii) the computing device configured to repeat the steps of extracting, training, making and combining for each of the plurality of fixed FOV sizes to generate a plurality of combined class decisions at respective ones of the plurality of fixed FOV sizes based on the first image parameter; (iii) the computing device configured to aggregate the plurality of combined class decisions at the respective ones of the plurality of fixed FOV sizes based on the first image parameter to yield an aggregated multi-FOV decision, using a first multi-FOV classifier from among a plurality of multi-FOV classifiers, wherein the first multi-FOV classifier aggregates the plurality of combined class decisions that are outputs of the ensembles at each of the plurality of fixed FOV sizes based on the first image parameter; and (iv) the computing device configured to produce the aggregated multi-FOV decision for the large heterogenous image based on the first image parameter.

According to one embodiment of the system, the system further comprises: (d) the computing device configured to produce an aggregated decision for the large heterogenous image based on a second image parameter from among the plurality of image parameters, comprising: (i) the computing device configured to produce a combined class decision for the plurality of FOVs at the first fixed FOV size based on the second image parameter, comprising: (1) the computing device configured to extract the second image parameter describing a spatial arrangement of at least one object from each FOV at the first fixed FOV size; (2) the computing device configured to train a first classifier from among a plurality of classifiers to identify the second image parameter that best describes the spatial arrangement for each FOV at the first fixed FOV size; (3) the computing device configured to make a second class decision for each FOV at the first fixed FOV size using a classification ensemble based on the second image parameter; (4) the computing device configured to combine the second class decisions for each of the plurality of FOVs at the first fixed FOV size to yield a combined class decision for the plurality of FOVs at the first fixed FOV size; and (5) the computing device configured to produce the combined class decision for each of the plurality of FOVs at the first fixed FOV size based on the second image parameter; (ii) the computing device configured to repeat the steps of extracting, training, making and combining for each of the plurality of FOV sizes to generate a plurality of combined class decisions at each of the plurality of fixed FOV sizes based on the second image parameter; (iii) the computing device configured to aggregate the plurality of combined class decisions at the respective ones of the plurality of fixed FOV sizes based on the second image parameter to yield an aggregated multi-FOV decision, using a second multi-FOV classifier from among a plurality of multi-FOV classifiers, wherein the second multi-FOV classifier aggregates the plurality of combined class decisions that are outputs of the ensembles at each of the plurality of fixed FOV sizes based on the second image parameter; and (iv) the computing device configured to produce the aggregated multi-FOV decision for the large heterogenous image based on the second image parameter; (e) the computing device configured to produce a plurality of aggregated multi-FOV decisions for the large heterogenous image based on the plurality of image parameters using a plurality of multi-FOV classifiers; (f) the computing device configured to integrate the aggregated multi-FOV decisions of steps (c), (d) or (e) to generate an integrated multi-parametric decision for the heterogenous image, using a multi-parametric classifier, wherein the second multi-parametric classifier interates outputs of the ensembles at each of the plurality of image parameters, and (g) the computing device configured to produce the integrated multi-parametric decision for the heterogenous image.

According to one embodiment, the heterogenous image is a microscopic image. According to one embodiment, the heterogenous image is a histopathologic image. According to one embodiment, the heterogenous image is a histopathologic image of a diseased tissue. According to one embodiment, the diseased tissue is selected from the group consisting of a cancer, an inflammatory disease, Crohn's disease, rheumatoid arthritis, microbial infections, and a combination thereof. According to one embodiment, the cancer is selected from the group consisting of a prostate cancer, a breast cancer, a pancreatic cancer, a colon cancer, a leukemia, a lymphoma, a myeloma, an ovarian cancer, a melanoma, a lung cancer, a glioma, a renal-cell cancer, and a combination thereof. According to one embodiment, the cancer is a breast cancer. According to one embodiment, the breast cancer is characterized by at least one immunohistochemical (IHC) marker selected from the group consisting of estrogen receptor (ER), progesterone receptor (PR), HER2, CA 15-3, CA 27.29, CEA, ER, PgR, uPA, PAI-1, Ki-67, and a combination thereof. According to one embodiment, the multi-FOV multi-parametric scheme obviates the need for a prior determination of optimal FOV size.

2(g), FIG. 2(j) and FIG. 2(m). The graphs are subsequently used to extract 50 features describing nuclear architecture. Exposure to large FOVs, as depicted in FIG. 2(e), FIG. 2(f) and FIG. 2(g), medium FOVs, as depicted in FIG. 2(h), FIG. 2(i) and FIG. 2(j), and small FOVs, as depicted in FIG. 2(k), FIG. 2(l) and FIG. 2(m), demonstrate variations in nuclear arrangement.

FIG. 3(a) is a plot showing classification accuracy and FIG. 3(b) is a plot showing positive predictive values, for the multi-FOV framework using local vascular density from 29 CD34 IHC stained histopathology slides over 10 trials of 3-fold cross-validation. The bar colors represent different FOV sizes as indicated. For comparison, global vascular density was also calculated directly from each slide.

FIG. 4(a) a plot showing classification accuracy and FIG. 4(b) a plot showing positive predictive values for the multi-FOV framework using architectural features from 29 H & E stained histopathology slides over 10 trials of 3-fold cross-validation. The bar colors represent different FOV sizes as indicated.

Figure 5:
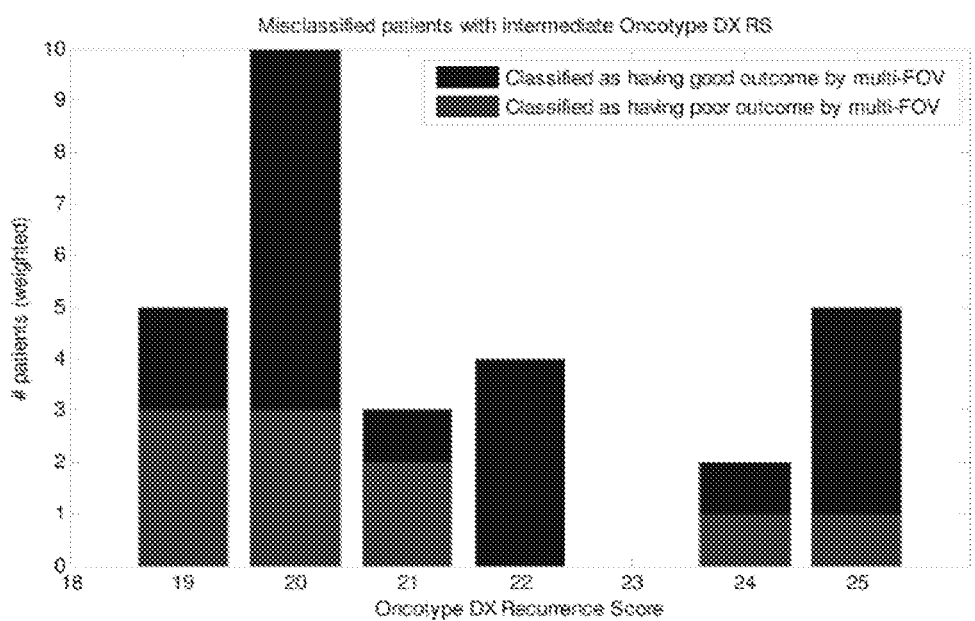

FIG. 5 shows a plot of patients with intermediate Oncotype DX Recurrence Scores (RS) that were found by the multi-FOV classifier to have either good (shown in dark grey) or poor (shown in light grey) prognosis.

Figure 6:
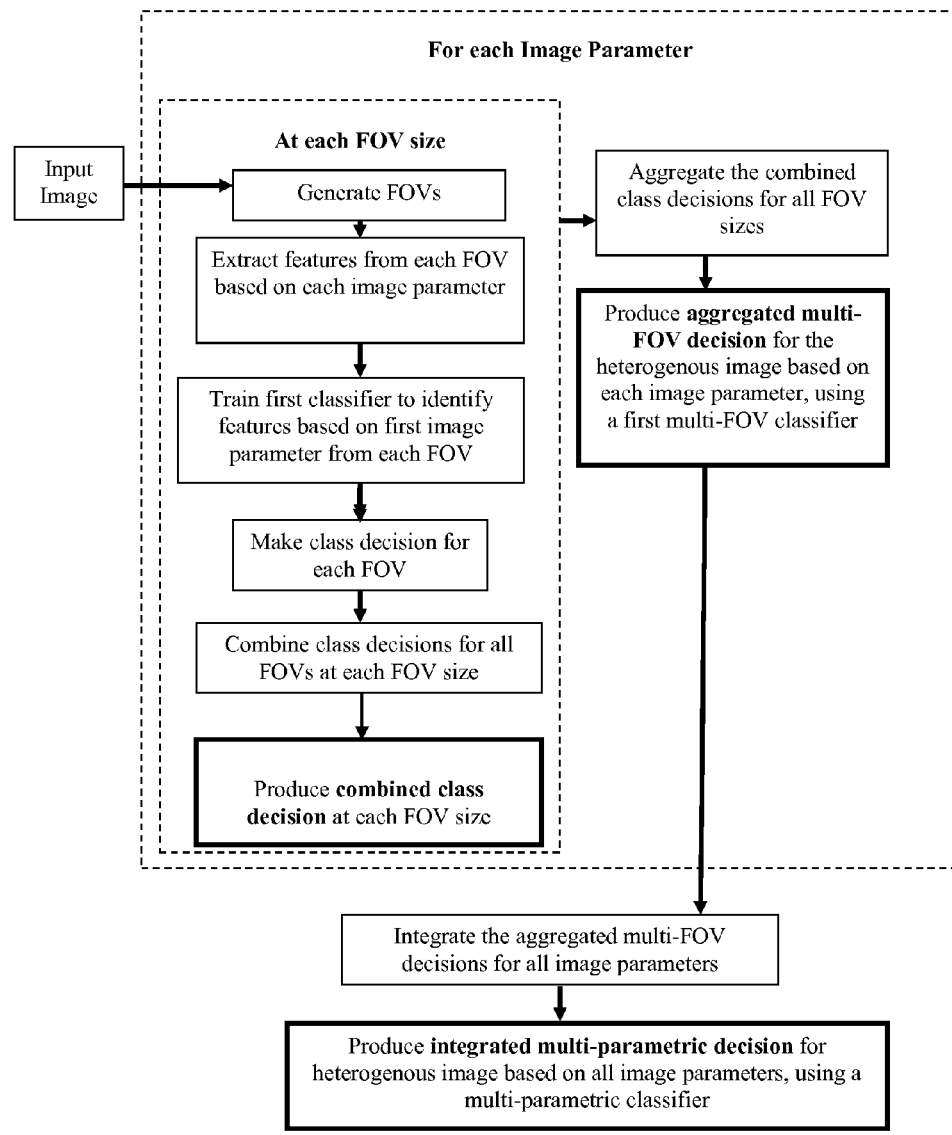

FIG. 6 shows a flowchart outlining the steps in the multi-FOV multi-parametric scheme for disease outcome prediction.

DETAILED DESCRIPTION

Glossary

The term "field of view" as used herein refers to part of space or plane imaged by an optical system, such for example, a microscope. The size of the field of view is determined by the components of the optical system, such as, for example, lenses, prisms and mirrors that regulate the beam of light entering a microscope.

The term "image parameter" as used herein refers to features of an image that can be observed, detected, and/or measured.

The term "classifier" as used herein refers to a computational device capable of performing a classification function. A classification function is a discrete value output function, such as for example prediction of disease outcome. According to the described invention, each of the parameters has its own separate classifiers. These classifiers are then combined to create a meta-classifier (combined classifier) which yields the final risk score.

Method for Image-Based Outcome Prediction

According to one aspect, the present invention provides a method for analyzing a heterogenous image, using a multi-field-of-view (FOV) multi-parametric scheme, the method comprising:
(a) inputting, via a computing device, a large heterogenous image;
(b) generating, via the computing device, a plurality of FOVs at a first fixed FOV size from among a plurality of fixed FOV sizes;
(c) producing, via the computing device, an aggregated multi-FOV decision for the large heterogenous image based on a first image parameter from among a plurality of image parameters, comprising:
  (i) producing a combined class decision for each of the plurality of FOVs at the first fixed FOV size based on the first image parameter, comprising:
    (1) extracting, via the computing device, the first image parameter describing a spatial arrangement of at least one object from each FOV at the first fixed FOV size;
    (2) training, via the computing device, a first classifier from among a plurality of classifiers identifying the first image parameter describing the spatial arrangement of the at least one object from each FOV at the first fixed FOV size;
    (3) making, via the computing device, a first class decision for each FOV at the first fixed FOV size using a classification ensemble based on the first image parameter;
    (4) combining, via the computing device, the first class decisions for each of the plurality of FOVs at the first fixed FOV size to yield the combined class decision for the plurality of FOVs at the first fixed FOV size; and
    (5) producing, via the computing device, the combined class decision for each of the plurality of FOVs at the first fixed FOV size based on the first image parameter;
  (ii) repeating, via the computing device, the steps of extracting, training, making and combining for each of the plurality of fixed FOV sizes to generate a plurality of combined class decisions at respective ones of the plurality of fixed FOV sizes based on the first image parameter;
  (iii) aggregating, via the computing device, the plurality of combined class decisions at the respective ones of the plurality of fixed FOV sizes based on the first image parameter to yield an aggregated multi-FOV decision, using a first multi-FOV classifier from among a plurality of multi-FOV classifiers, wherein the first multi-FOV classifier aggregates the plurality of combined class decisions that are outputs of the ensembles at each of the plurality of fixed FOV sizes based on the first image parameter; and
  (iv) producing the aggregated multi-FOV decision for the large heterogenous image based on the first image parameter.

According to some embodiments, the method of analyzing a heterogenous image further comprises:
(d) producing an aggregated decision for the large heterogenous image based on a second image parameter from among the plurality of image parameters, comprising:
  (i) producing a combined class decision for the plurality of FOVs at the first fixed FOV size based on the second image parameter, comprising:
    (1) extracting, via the computing device, the second image parameter describing a spatial arrangement of at least one object from each FOV at the first fixed FOV size;
    (2) training, via the computing device, a first classifier from among a plurality of classifiers, identifying the second image parameter that best describes the spatial arrangement for each FOV at the first fixed FOV size;
    (3) making, via the computing device, a second class decision for each FOV at the first fixed FOV size using a classification ensemble based on the second image parameter;
    (4) combining, via the computing device, the second class decisions for each of the plurality of FOVs at the first fixed FOV size to yield a combined class decision for the plurality of FOVs at the first fixed FOV size; and (5) producing, via the computing device, the combined class decision for each of the plurality of FOVs at the first fixed FOV size based on the second image parameter;

(ii) repeating, via the computing device, the steps of extracting, training, making and combining for each of the plurality of FOV sizes to generate a plurality of combined class decisions at each of the plurality of fixed FOV sizes based on the second image parameter;

(iii) aggregating, via the computing device, the plurality of combined class decisions at the respective ones of the plurality of fixed FOV sizes based on the second image parameter to yield an aggregated multi-FOV decision, using a first multi-FOV classifier from among a plurality of multi-FOV classifiers, wherein the second multi-FOV classifier aggregates the plurality of the combined class decisions that are outputs of the ensembles at each of the plurality of fixed FOV sizes based on the second image parameter; and (iv) producing the aggregated multi-FOV decision for the large heterogenous image based on the second image parameter;

(e) producing, via the computing device, a plurality of aggregated multi-FOV decisions for the large heterogenous image based on the plurality of image parameters using a plurality of multi-FOV classifiers;

(f) integrating, via the computing device, the aggregated multi-FOV decisions of steps (c), (d) or (e) to generate an integrated multi-parametric decision for the heterogenous image; using a multi-parametric classifier, wherein the multi-parametric classifier integrates the plurality of aggregated multi-FOV decisions that are outputs of the ensembles based on each of the plurality of image parameters, and (g) producing, via the computing device, the integrated multi-parametric decision for the heterogenous image.

According to another aspect, the present invention provides a method of development and quantitative evaluation of image-based architectural and vascular features for patient outcome prediction in whole slide histopathology. According to another aspect, the present invention provides a method of achieving improved prognostic prediction of patient outcome by synergistic combination of image-based parameters from multi-parametric histological studies.

According to one embodiment, the present invention provides a method to perform robust and reproducible classification of a heterogenous image into low, intermediate, and high disease aggressiveness, using a multi-FOV scheme via a computing device. According to another embodiment, the present invention provides a method to predict disease outcome using a heterogenous image obtained from a patient implementing a multi-FOV scheme via a computing device.

In some such embodiments, the heterogenous image is a microscopic image. In some such embodiments, the heterogenous image is a histopathologic image. In some embodiments, the heterogenous image is a histopathologic image of a diseased tissue. Exemplary diseased tissue includes but is not limited to a cancer, an inflammatory disease, Crohn's disease, rheumatoid arthritis, microbial infections, etc. Exemplary cancers include but is not limited to prostate cancer, breast cancer, pancreatic cancer, colon cancer, leukemia, lymphoma, myeloma, ovarian cancer, melanoma, lung cancer, glioma, renal-cell cancer, etc. In some such embodiments, the breast cancer is characterized by the presence of at least one immunohistochemical (IHC) marker. Exemplary IHC marker include but is not limited to estrogen receptor (ER), progesterone receptor (PR), HER2, CA 15-3, CA 27.29, CEA, ER, PgR, uPA, PAI-1, Ki-67, etc.

According to some embodiments, the histopathology image is stained by a histochemical staining method. Exemplary histochemical staining methods include but are not limited to a monoclonal antibody, a polyclonal antibody, CD34, hematoxylin, eosin, Hoechst stain, 4',6-diamidino-2-phenylindole (DAPI), etc.

According to one embodiment, the present invention provides a low cost quantitative image risk predictor. According to one embodiment, the image risk predictor performs on par with expensive gene expression assays (e.g. Oncotype DX) in terms of predicting outcome in ER+BCa patients. According to one embodiment, the present invention provides a multi-field-of-view (multi-FOV) framework that integrates vascular and structural information from multiple FOVs at different sizes in ER+BCa histopathology. According to one embodiment, the present invention provides a method for quantitative evaluation of vascular density from CD34 IHC stained slides as a prognostic indicator for ER+BCa via comparison to Oncotype DX Recurrence Scores (RS).

According to one embodiment, the multi-FOV scheme uses a fixed image scale and extracts image features at FOVs of different sizes, a highly desirable attribute in heterogeneous images where it is not clear which FOV sizes will contain class discriminatory information. The present invention circumvents the need to empirically determine the optimal FOV size for classification. The present invention combines class predictions from image features across all FOV sizes. According to one embodiment, class predictions are made by two multi-FOV classifiers applied independently to image parameters describing (1) nuclear architecture and (2) vascular density from the same patient. These class predictions are subsequently combined to form a multi-parametric prediction for the patient. Exemplary image parameters include but are not limited to nuclear architecture, vascular density, etc.

According to some such embodiments, the image parameter describes nuclear architecture of diseased cells. According to some embodiments, the image parameter is determined using a computational method, for example, not limited to, a Voronoi Diagram method, a Delaunay Triangulation method, a Minimum Spanning Tree graph method, etc. According to some embodiments, the image feature describes vascular density of diseased cells.

In one embodiment, the vascular density is automatically extracted from CD34 IHC stained histopathology and used as the sole image-based feature to quantify angiogenic activity. Specifically, a color deconvolution method described in Ruifrok, A. C., et al., "Quantification of histochemical staining by color deconvolution.", Anal. Quant. Cytol. Histol., August 2001, 23(4): 291-299, which takes advantage of light-absorbing properties of histological staining, is used to automatically isolate the brown diaminobenzidine (DAB) compound signifying CD34 expression. In one embodiment, the extent of DAB staining in a particular FOV is defined as vascular density and used as feature in the multi-FOV scheme of the present invention.

Methods to model and quantify tumor morphology in H & E stained histology through the construction of various graphs. (Sudbø, J. et al., "Prognostic value of graph theory-based tissue architecture analysis in carcinomas of the tongue.", Lab. Invest., December 2000, 80(12): 1881-1889; Doyle, S. et al., "Automated grading of prostate cancer using architectural and textural image features.", In: Proc. 4th IEEE Int. Symp. Biomedical Imaging: From Nano to Macro ISBI 2007, pp. 1284-1287; WO 2010/088672 titled "Image-based risk score—a prognostic predictor of survival and outcome from digital histopathology"). A graph (e.g. Voronoi Diagram) is constructed by drawing edges between relevant tissue structures (e.g. nuclei) in a particular fashion. Graph-based features describing the spatial arrangement of these structures (e.g. Voronoi cell area) are then defined to quantify tissue architecture. In one embodiment, the nuclear architecture is quantified in H & E stained histopathology by constructing, for example, graphs, including but not limited to Voronoi Diagram, Delaunay Triangulation, and Minimum Spanning Tree, using individual cancer nuclei as nodes. The nuclei are first identified automatically by isolating the blue hematoxylin stain, which preferentially stains nuclear material, via color deconvolution. For example, a total of 50 graph-based features describing the spatial arrangement of cancer nuclei are extracted from each FOV. While both vascular density and nuclear architecture are widely considered to have prognostic value, their biological foundations are very different. This demonstrates that these two parameter classes are complementary and that their combination produces an improved predictor of patient outcome.

According to some embodiments, the class decision identifies disease aggressiveness of each FOV at a fixed FOV size. According to some embodiments, the combined class decision identifies disease aggressiveness at each FOV size. According to some embodiments, the aggregated multi-FOV decision identifies disease aggressiveness for the heterogenous image based on the first image parameter. According to some embodiments, the integrated multi-parametric decision identified disease aggressiveness based on each of the plurality of the image parameters. According to some embodiments, the disease aggressiveness is selected from the group consisting of good disease outcome, intermediate disease outcome or poor disease outcome.

System for Image-Based Outcome Prediction

According to one aspect, the present invention provides a system for analyzing a heterogenous image, using a multi-field of view (FOV) multi-parametric scheme via a computing device, comprising:
  (a) a computing device configured to input an image;
  (b) the computing device configured to generate a plurality of FOVs at a first fixed FOV size from among a plurality of fixed FOV sizes;
  (c) the computing device configured to produce an aggregated multi-FOV decision for the large heterogenous image based on a first image parameter from among a plurality of image parameters, comprising:
    (i) the computing device configured to produce a combined class decision for each of the plurality of FOVs at the first fixed FOV size based on the first image parameter, comprising:
      (1) the computing device configured to extract the first image parameter describing a spatial arrangement of at least one object from each FOV at the first fixed FOV size;
      (2) the computing device configured to train a first classifier from among a plurality of classifiers identifying the first image parameter describing the spatial arrangement of the at least one object from each FOV at the first fixed FOV size;
      (3) the computing device configured to make a first class decision for each FOV at the first fixed FOV size using a classification ensemble based on the first image parameter;
      (4) the computing device configured to combine the first class decisions for each of the plurality of FOVs at the first fixed FOV size to yield the combined class decision for the plurality of FOVs at the first fixed FOV size; and
      (5) the computing device configured to produce the combined class decision for each of the plurality of FOVs at the first fixed FOV size based on the first image parameter;
    (ii) the computing device configured to repeat the steps of extracting, training, making and combining for each of the plurality of fixed FOV sizes to generate a plurality of combined class decisions at respective ones of the plurality of fixed FOV sizes based on the first image parameter;
    (iii) the computing device configured to aggregate the plurality of combined class decisions at the respective ones of the plurality of fixed FOV sizes based on the first image parameter to yield an aggregated multi-FOV decision, using a first multi-FOV classifier from among a plurality of multi-FOV classifiers, wherein the first multi-FOV classifier aggregates the plurality of combined class decisions that are outputs of the ensembles at each of the plurality of fixed FOV sizes based on the first image parameter; and
    (iv) the computing device configured to produce the aggregated multi-FOV decision for the large heterogenous image based on the first image parameter.

According to some embodiments, the system for analyzing a heterogenous image further comprises:
  (d) the computing device configured to produce an aggregated decision for the large heterogenous image based on a second image parameter from among the plurality of image parameters, comprising:
    (i) the computing device configured to produce a combined class decision for the plurality of FOVs at the first fixed FOV size based on the second image parameter, comprising:
      (1) the computing device configured to extract the second image parameter describing a spatial arrangement of at least one object from each FOV at the first fixed FOV size;
      (2) the computing device configured to train a first classifier from among a plurality of classifiers to identify the second image parameter that best describes the spatial arrangement for each FOV at the first fixed FOV size;
      (3) the computing device configured to make a second class decision for each FOV at the first fixed FOV size using a classification ensemble based on the second image parameter;
      (4) the computing device configured to combine the second class decisions for each of the plurality of FOVs at the first fixed FOV size to yield a combined class decision for the plurality of FOVs at the first fixed FOV size; and
      (5) the computing device configured to produce the combined class decision for each of the plurality of FOVs at the first fixed FOV size based on the second image parameter;
    (ii) the computing device configured to repeat the steps of extracting, training, making and combining for each of the plurality of FOV sizes to generate a plurality of combined class decisions at each of the plurality of fixed FOV sizes based on the second image parameter;
    (iii) the computing device configured to aggregate the plurality of combined class decisions at the respective ones of the plurality of fixed FOV sizes based on the second image parameter to yield an aggregated multi-FOV decision, using a second multi-FOV classifier from among a plurality of multi-FOV classifiers, wherein the second multi-FOV classifier aggregates the plurality of combined class decisions that are outputs of the ensembles at each of the plurality of fixed FOV sizes based on the second image parameter; and (iv) the computing device configured to produce the aggregated multi-FOV decision for the large heterogenous image based on the second image parameter;

(e) the computing device configured to produce a plurality of aggregated multi-FOV decisions for the large heterogenous image based on the plurality of image parameters using a plurality of multi-FOV classifiers;

(f) the computing device configured to integrate the aggregated multi-FOV decisions of steps (c), (d) or (e) to generate an integrated multi-parametric decision for the heterogenous image, using a multi-parametric classifier, wherein the second multi-parametric classifier interates outputs of the ensembles at each of the plurality of image parameters, and (g) the computing device configured to produce the integrated multi-parametric decision for the heterogenous image.

According to one embodiment, the present invention provides a system of development and quantitative evaluation of image-based architectural and vascular features for patient outcome prediction in whole slide histopathology. According to one embodiment, the present invention provides a system of achieving improved prognostic prediction of patient outcome by synergistic combination of image-based parameters from multi-parametric histological studies. According to one embodiment, the present invention provides a system for prediction of patient outcome using a multi-FOV multi-parametric method.

According to one embodiment, the present invention provides a system to perform robust and reproducible classification of a heterogenous image into low, intermediate, and high disease aggressiveness, using a multi-FOV scheme via a computing device. According to another embodiment, the present invention provides a system to predict disease outcome using a heterogenous image obtained from a patient implementing a multi-FOV scheme via a computing device.

In some such embodiments, the heterogenous image is a histopathology slide. In some embodiments, the heterogenous image is a histopathology image of a diseased tissue. In some embodiments, the diseased tissue is selected from a group consisting of a cancer, an inflammatory disease, Crohn's disease, rheumatoid arthritis, microbial infections, and a combination thereof. In some embodiments, the cancer is selected from the group consisting of a prostate cancer, a breast cancer, a colon cancer, a leukemia, a lymphoma, a myeloma, an ovarian cancer, a melanoma, a lung cancer, a glioma, a renal-cell cancer, and a combination thereof. In some such embodiments, the breast cancer is characterized by the presence of at least one immunohistochemical (IHC) marker. According to some such embodiments, the at least one IHC marker is selected from the group consisting of estrogen receptor (ER), progesterone receptor (PR), HER2, CA 15-3, CA 27.29, CEA, ER, PgR, uPA, PAI-1, Ki-67, and a combination thereof.

According to some embodiments, the histopathology image is stained by a histochemical staining method. Exemplary histochemical staining methods include but are not limited to a monoclonal antibody, a polyclonal antibody, CD34, hematoxylin, eosin, Hoeschst stain, 4',6-diamidino-2-phenylindole (DAPI), etc.

According to some such embodiments, the image parameter describes nuclear architecture of diseased cells. According to some embodiments, the image parameter is determined using a computational method, for example, not limited to, a Voronoi Diagram method, a Delaunay Triangulation method, a Minimum Spanning Tree graph method, etc. According to some embodiments, the image feature describes vascular density of diseased cells.

According to some embodiments, the class decision identifies disease aggressiveness of each FOV at a fixed FOV size. According to some embodiments, the combined class decision identifies disease aggressiveness at each FOV size. According to some embodiments, the aggregated multi-FOV decision identifies disease aggressiveness for the heterogenous image based on the first image parameter. According to some embodiments, the integrated multi-parametric decision identified disease aggressiveness based on each of the plurality of the image parameters. According to some embodiments, the disease aggressiveness is selected from the group consisting of good disease outcome, intermediate disease outcome or poor disease outcome.

Multi-FOV Scheme

An image scene $C=(C,g)$ is defined as a 2D set of pixels $c \in C$ with associated intensity function $g$ and class label $y \in \{0,1\}$. For each $C$ and FOV size $\tau \in T$, a grid containing FOVs $D^\tau = \{d_1^\tau, d_2^\tau, \ldots, d_M^\tau\}$ is constructed, where $d_m^\tau \in C$, $m \in \{1, 2, \ldots, M\}$ is a square FOV with edge length of pixels. We define $f(d_m^\tau)$ as the function that extracts features from each $d_m^\tau$. Grid construction and feature extraction are repeated likewise for each $\tau \in T$.

A consensus predictor over multiple FOV sizes is defined as $H(D)=E_\tau[H(D^\tau,\tau)]$, where $D=\{D^\tau: \forall \tau \in T\}$ is the collective data over all FOV sizes, $H(D^\tau,\tau)$ is a meta-classifier for each $\tau$, and $E_\tau$ is the expectation of $H(D^\tau,\tau)$ at FOV size $\tau \in T$. The mean squared error of classification at individual FOV sizes is given by $e_\tau = E_\tau[y - H(D^\tau,\tau)]^2$ and the error of the consensus predictor is given by $e_A = [y-H(D)]^2$.

Proposition 1 Given independent classifiers at FOV sizes $\tau \in T$, $e_\tau \geq e_A$.

Proof.

$$e_\tau = E_\tau[y - H(D^\tau, \tau)]^2 = y^2 - 2yE_\tau[H(D^\tau, \tau)] + E_\tau[H^2(D^\tau, \tau)]$$

Since $$E_\tau[H^2(D^\tau, \tau)] \geq [E_\tau[H(D^\tau, \tau)]]^2,$$

$$\geq y^2 - 2yE_\tau[H(D^\tau, \tau)] + [E_\tau[H(D^\tau, \tau)]]^2$$

$$\geq y^2 - 2yH(D) + H^2(D)$$

$$\geq [y - H(D)]^2$$

$$\geq e_A \;\square$$

Independent predictors at different FOV sizes (reasonable assumption since different information is discernible at different FOV sizes in heterogeneous images) are used as the "weak" classifiers used to build the "strong" consensus result. To this end, Proposition 1 ensures that the consensus error $e_A$ will always be less than the mean error $e_\tau$ of individual FOV size classifiers.

Integrated FOV Size Prediction Via Individual FOV Classifier

A pre-trained classifier $h(d_m^\tau,f) \in \{0,1\}$ is first used to assign an initial class decision to each individual FOV $d^\tau$ with associated features f. Subsequently, decisions are aggregated for all FOVs $D^\tau$ to achieve a combined decision $H(D^\tau,\tau)$ at a single FOV size $\tau \in T$.

---
Algorithm 1 Individual FOV Classifier
---

Input: Image C. FOV sizes $T = \{t_1, t_2, \ldots, t_N\}$. Classifier $h(d_m^\tau, f)$.
Output: Aggregate prediction $H(D^\tau, \tau)$ for each FOV size $\tau \in T$.
1: for all $\tau \in T$ do
2:    From C, define M, $\tau \times \tau$ FOVs $D^\tau = \{d_1^\tau, d_2^\tau, \ldots, d_M^\tau\}$.
3:    Extract features f from $d_m^\tau$, $\forall\, m \in M$.
4:    Apply classifier $h(d_m^\tau, f)$ for initial classification of each $d_m^\tau$.
5:    Make aggregate prediction $H(D^\tau, \tau) = \frac{1}{M}\sum_{m=1}^{M} h(d_m^\tau, f)$ over all FOVs $D^\tau$.
6: end for

---

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges which may independently be included in the smaller ranges is also encompassed within the invention, subject to any specifically excluded limit in the stated range. Where the stated range includes one or both of the limits, ranges excluding either both of those included limits are also included in the invention.

Unless defined otherwise, all technical and scientific terms used herein have the same meaning as commonly understood by one of ordinary skill in the art to which this invention belongs. Although any method and materials similar or equivalent to those described herein can also be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural references unless the context clearly dictates otherwise. All technical and scientific terms used herein have the same meaning.

The publications discussed herein are provided solely for their disclosure prior to the filing date of the present application. Nothing herein is to be considered as an admission that the present invention is not entitled to antedate such publication by virtue of prior invention. Further, the dates of publication provided may be different from the actual publication dates which may need to be independently confirmed.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Example 1

Evaluation of the Multi-FOV Multi-Parametric Integration Method to Distinguish Breast Cancer Patients of Differential Grading Dataset This example demonstrates the ability of the multi-FOV multi-parametric integration method of the present invention to distinguish patients with low, intermediate, and high Oncotype DX RS. The Oncotype DX Recurrence Score (RS) as a relative ground truth. Oncotype DX, which produces a quantitative RS between 0 and 100, is a molecular assay that has been clinically validated to predict the likelihood of 10-year distant recurrence and the expected benefit from adjuvant chemotherapy for early-stage, ER+BCa patients. (Paik, S. et al., "A multigene assay to predict recurrence of tamoxifen-treated, node-negative breast cancer." N. Engl. J. Med., December 2004, 351(27): 2817-2826).

The multi-FOV classifier is leveraged for the task of quantifying BCa disease outcome by distinguishing tumors based on Oncotype DX Recurrence Scores (RS). CD34 immunohistochemistry (IHC) and hematoxylin and eosin (H & E) stained histopathology images from 29 patients (9 low RS, 11 intermediate RS, 9 high RS) were digitized via a whole slide scanner at 1 μm/pixel resolution (Table 1). Each slide is accompanied by (a) annotations from an expert pathologist denoting extent of invasive cancer, and (b) RS values denoting good (0<RS<18), intermediate (18≤RS≤30), or poor (30<RS<100) outcome. Table 1 lists a summary of the data cohort comprising 29 ER+ breast cancer patients used in this example.

TABLE 1

A summary of the data cohort comprising 29 ER+ BCa patients used in this paper. For each class, the number of patients and the range of Oncotype DX RS values are given.

| Patient Class | # Patients | RS Range |
|---|---|---|
| Low | 9 | 0-17 |
| Intermediate | 11 | 18-30 |
| High | 9 | 31-100 |

Classification Strategy

In each experiment, classification accuracy was computed by comparing the class predictions made by each classifier (multi-FOV and individual FOV sizes) to the ground truth, i.e. good, intermediate, or poor outcome, delineated by the Oncotype DX RS for each slide. To mitigate the bias associated with the selection of training and testing samples, each classifier was evaluated via a 3-fold cross-validation scheme, as previously described. (Duda, R., et al., "Pattern Classification.", John Wiley & Sons, 2001). For each experiment, the dataset was first divided randomly into three subsets of equal size. FOVs from two subsets were used to train the preliminary classifier h (via a Random Forest classifier, previously described. (Breiman, L., "Random forests.", Machine Learning, 2001, 45: 5-32). FOVs from the remaining subset was used for evaluation. The training and testing subsets were rotated so that each slide was evaluated once. The entire cross-validation procedure was repeated 10 times to produce mean and standard deviation classification accuracy values.

Example 2

Multi-FOV Classifier for Quantifying Vascular Density in CD34 IHC Stained Histopathology This example demonstrates the use of the multi-FOV classifier of the present invention to quantify vascular density in CD34 IHC stained histopathological slides.

The density of vascular formation is calculated to capture the degree of angiogenesis in an image via the following steps.

Step 1: Color deconvolution split the image into channels representing DAB (i.e. CD34 expression) and hematoxylin (FIGS. 1(*b*), (*c*), (*f*), (*g*)).

Step 2: The DAB channel was thresholded to produce a set of brown pixels corresponding to angiogenic vessels (FIGS. 1(*d*), (*h*)).

Step 3: Global vascular density is defined as fraction of brown pixels within region of cancer extent from entire slide.

Step 4: Local vascular density is defined as fraction of brown pixels from a smaller FOV (of size $\tau \epsilon T$) within region of cancer extent. A range of FOV sizes (T={250, 500, 1000} pixels) was considered in this work.

Figure 1:
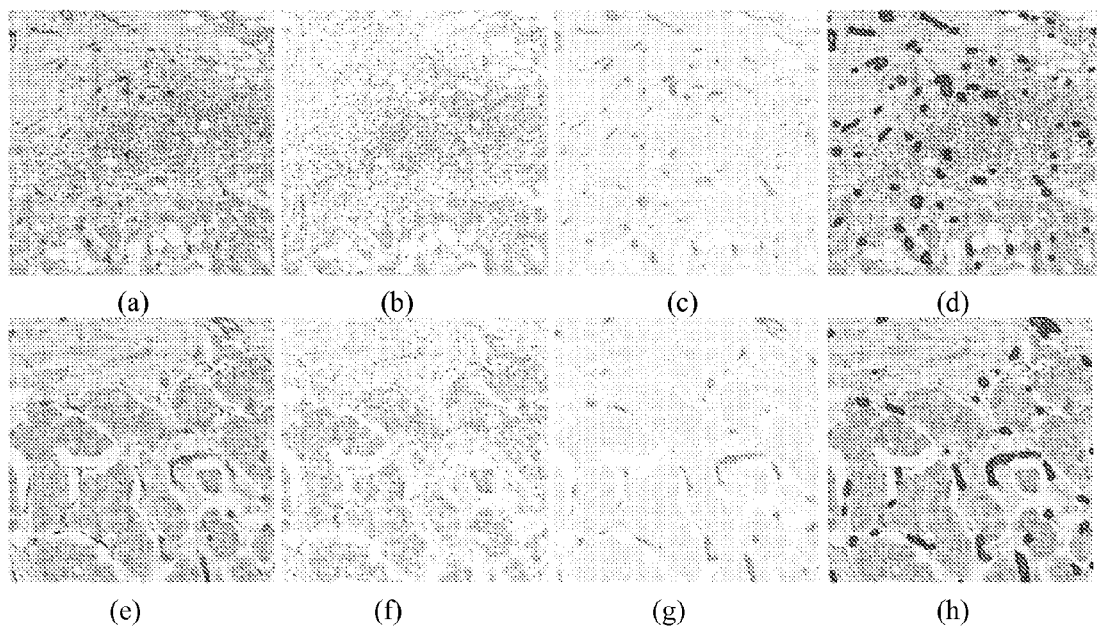
FIG. 1(a) and FIG. 1(e) depict CD34 immunohistochemically (IHC) stained histopathology images.
FIG. 1(b) and FIG. 1(f) depict color deconvolution splitting of histopathology images in FIG. 1(a) and FIG. 1(b) respectively into hematoxylin channel.
FIG. 1(c) and FIG. 1(g) depict color deconvolution splitting of histopathology images in FIG. 1(a) and FIG. 1(b), respectively into 3,3'-diaminobenzidine (DAB) channel.
FIG. 1(d) and FIG. 1(h) depict thresholded histopathology images of FIG. 1(c) and FIG. 1(g), respectively, upon color deconvolution splitting into the DAB channel, to isolate segmented regions expressing CD34 (i.e., brown pixels corresponding to angiogenic vessels).

FIG. 1 depicts histological images of ER+ breast cancer that have been CD34 stained, split into hematoxylin and DAB channels by color deconvolution and the DAB channel thresholded to clarify segmented regions expressing the CD34 protein.

The ability of the multi-FOV classifier to outperform classification at individual FOV sizes is borne out by the local vascular density (FIG. 3), which is able to distinguish entire CD34 IHC stained slides with good vs. poor, good vs. intermediate, and intermediate vs. poor Oncotype DX RS values with classification accuracies of 0.82±0.04, 0.75±0.06, 0.86±0.04, respectively, and positive predictive values (PPV) of 0.82±0.06, 0.76±0.06, 0.87±0.06, respectively. The theoretical justification for the multi-FOV framework suggests that a multi-FOV classifier will outperform the majority of classifiers for individual FOV sizes. This concept is validated empirically in this example, where multi-FOV classifiers perform as well as (and usually better than) individual FOV sizes in both classification accuracy and PPV (FIG. 3).

Figure 3:
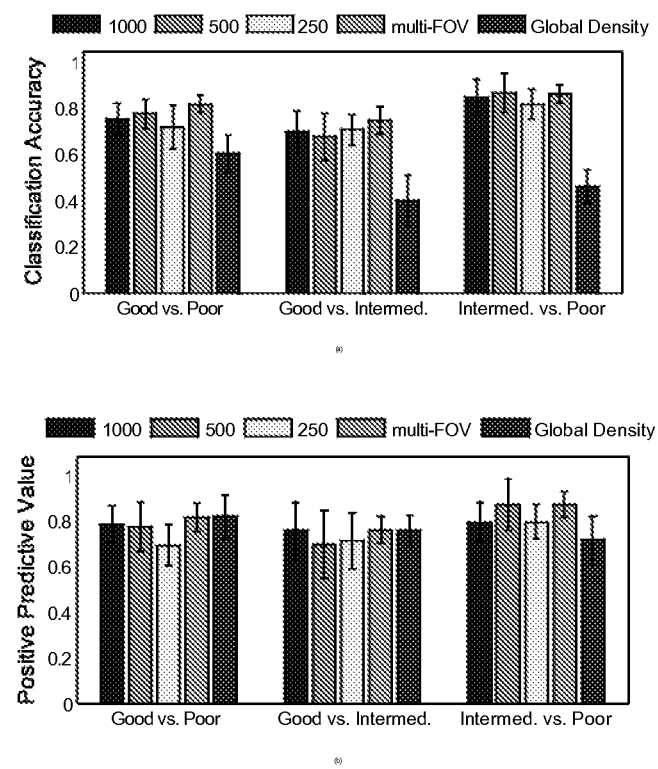

In addition, global vascular density produces corresponding classification accuracies of 0.60±0.08, 0.40±0.11, 0.46±0.07 and PPV of 0.82±0.09, 0.76±0.07, and 0.72±0.11, respectively (FIG. 3). Experiment 1 demonstrates that the multi-FOV classifier (in conjunction with local vascular density) consistently outperforms whole-slide global vascular density in discriminating ER+ BCa with low, intermediate, and high Oncotype DX RS (FIG. 3). The superior performance of the multi-FOV classifier is likely due to its ability to capture local variations in vascular density and robustness to intra-slide heterogeneity. The multi-FOV framework also has an added benefit in that it readily accommodates the inclusion of complimentary structural information (e.g. nuclear architecture).

Example 3

Multi-FOV Classifier for Quantifying Tissue Morphology on H & E Stained Histopathology This example demonstrates the use of the Multi-FOV classifier of the present invention to quantify tissue morphology on H&E stained histopathological slides.

The variation in the spatial arrangement of cancer nuclei is quantified to capture the BCa tissue structure in an image via the following steps:

Step 1: Color deconvolution is used to separate image into channels representing hematoxylin and eosin stains (FIGS. 2(*b*), (*c*)).

Step 2: Since hematoxylin stains nuclear material, individual cancer nuclei were detected by thresholding the hematoxylin channel (FIG. 2(*d*)).

Step 3: Cancer nuclei were used as vertices for construction of Voronoi Diagram (FIGS. 2(*e*), (*h*), (*k*)), Delaunay Triangulation (FIGS. 2(*f*), (*i*), (*l*)), and Minimum Spanning Tree (FIGS. 2(*g*), (*j*), (*m*)), from which 50 architectural features (Table 2) were extracted for each image.

Step 4: Architectural features are calculated for individual FOVs within regions of cancer extent. A wide range of FOV sizes ($\tau \epsilon$ {250, 500, 1000, 2000} pixels) was considered in this example. Table 2 enlists a breakdown of the 50 architectural features extracted from the Voronoi Diagram, Delaunay Triangulation, and Minimum Spanning Tree graphs.

TABLE 2

A breakdown of the 50 architectural features extracted from the Voronoi Diagram, Delaunay Triangulation, and Minimum Spanning Tree graphs

| Type | # | Description |
| --- | --- | --- |
| Voronoi Diagram | 13 | Polygon area, perimeter, chord length |
| Delaunay Triangulation | 8 | Triangle side length, area |
| Minimum Spanning Tree | 4 | Edge Length |
| Nearest Neighbor | 25 | Density, distance to nearest nuclei |

Figure 2:
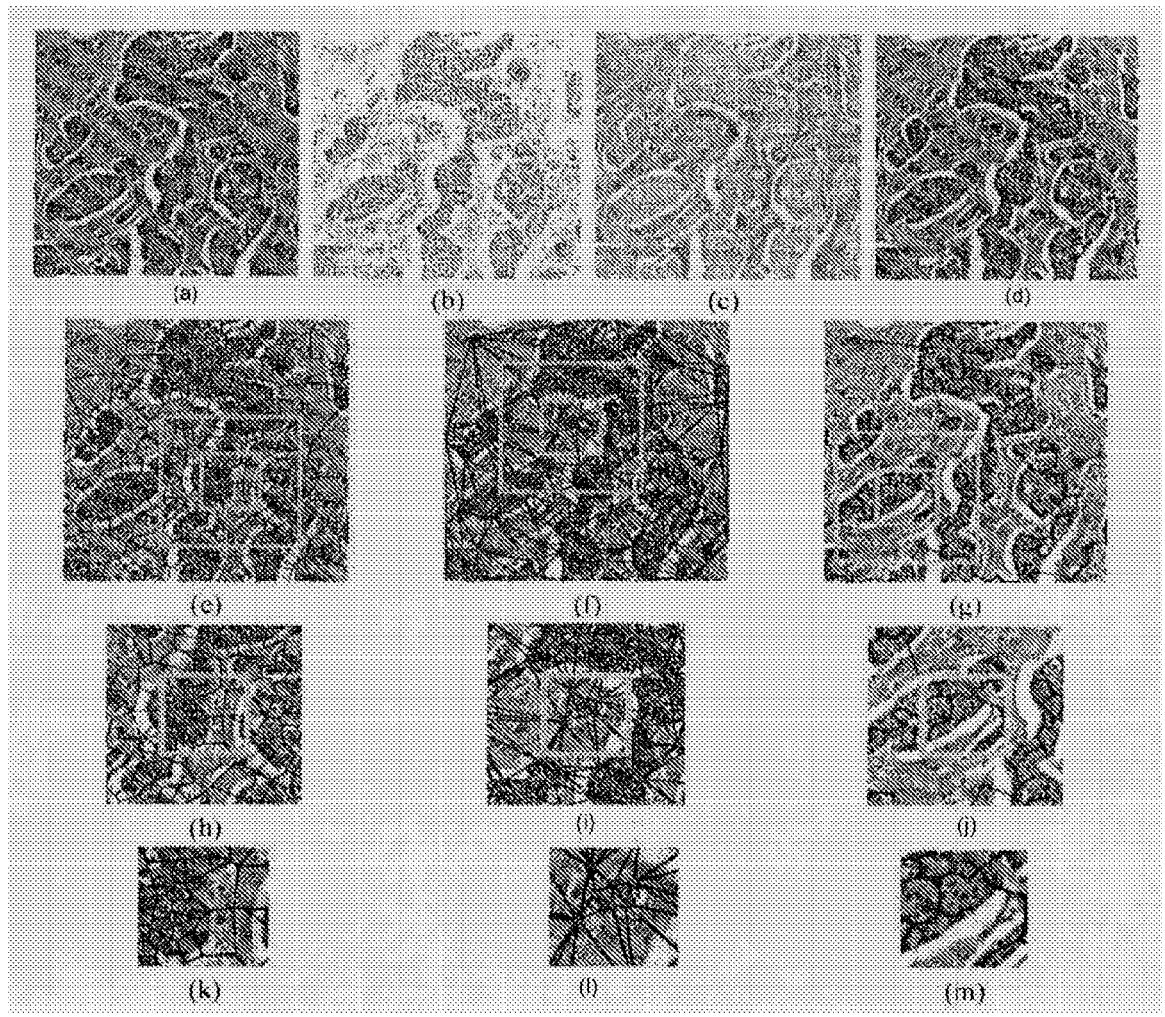
FIG. 2(a) depicts a hematoxylin and eosin (H & E) stained histopathology image.
FIG. 2(b) depicts color deconvolution splitting of the histopathology image of FIG. 2(a) in the hematoxylin channel.
FIG. 2(c) depicts color deconvolution splitting of the histopathology image of FIG. 2(a) in the eosin channel.
FIG. 2(d) depicts thresholding of the hematoxylin channel to detect centroids of individual cancer nuclei, which are, subsequently, used to construct Voronoi Diagram, as depicted in FIG. 2(e), FIG. 2(h) and FIG. 2(k), the Delaunay Triangulation, as depicted in FIG. 2(f), FIG. 2(i) and FIG. 2(l), and the Minimum Spanning Tree, as depicted in FIG.

FIG. 2 depicts H & E stained histological images of ER+ Breast cancer patients showing color deconvolution in the hematoxylin and eosin channels and thresholding of the hematoxylin channels.

Figure 4:
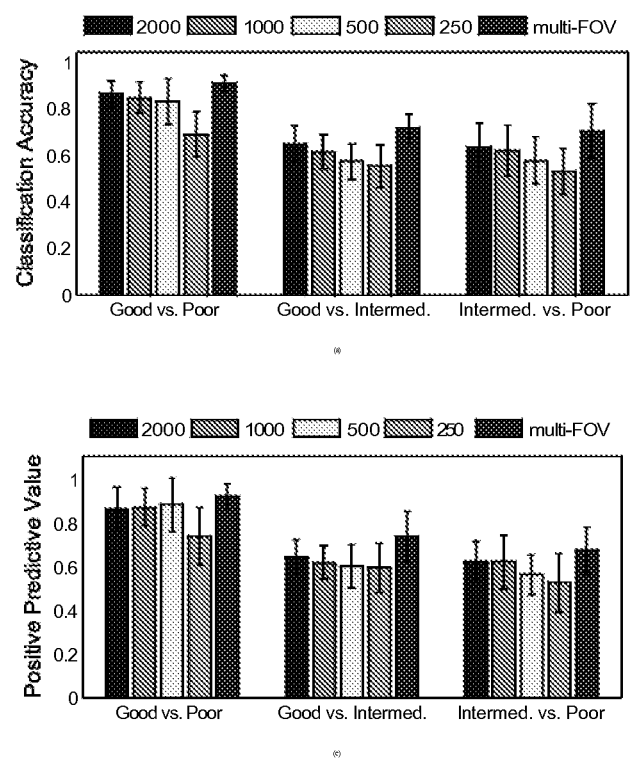

FIG. 4 shows that the architectural features (in conjunction with the multi-FOV classifier) are able to discriminate H & E stained slides with good vs. poor, good vs. intermediate, and intermediate vs. poor Oncotype DX RS at classification accuracies of 0.91±0.04, 0.72±0.06, 0.71±0.11, respectively, and positive predictive values of 0.92±0.06, 0.74±0.12, 0.68±0.11, respectively. The argument in favor of the multi-FOV classifier is even stronger in Experiment 2 (compared to Experiment 1), where it shows significantly increased performance over individual FOV sizes (FIG. 4).

Example 4

Multi-Parametric Classifier for Combining Features from H & E and IHC Stained Histopathology This example demonstrates the use of the multi-parametric classifier for combining features from H & E and IHC stained histopathology.

Since vascular density and nuclear architecture utilize distinct biological phenomena to describe disease aggressiveness, we expect a combination of the two data channels to produce improved classification.

Step 1: Example 2 was performed and resulting class decision $H_{IHC} \epsilon \{0,1\}$ made for each slide was saved.

Step 2: Example 3 was performed and resulting class decision $H_{HE} \epsilon \{0,1\}$ made for each slide was saved.

Step 3: a decision-level prediction $\hat{H} = H_{IHC} \wedge H_{HE} \epsilon \{0,1\}$ was generated based on the independent class predictions made from the H & E and IHC stained slides. The $\wedge$ operation is defined as "logical AND", whereby $\hat{H}=1$ if both $H_{IHC}=1$ and $H_{HE}=1$. Conversely, $\hat{H}=a$ if either $H_{IHC}=0$ or $H_{HE}=0$.

Performing a decision-level combination of vascular density and nuclear architecture produces classification accuracies of 0.91±0.02, 0.76±0.05, 0.83±0.08 and PPV of 0.94±0.10, 0.85±0.11, 0.92±0.13, for distinguishing good vs. poor, good vs. intermediate, and intermediate vs. poor RS values, respectively (Table 3). The fact that vascular density and nuclear architecture exploit such disparate aspects of cancer biology (i.e. angiogenesis and tissue morphology, respectively) suggests that the two feature classes are complimentary and integration will yield improved classification. Example 4 shows that a decision-level combination of the two feature sets maintains high levels of classification accuracy while improving positive predictive values (Table 3) over the corresponding multi-FOV classifiers from Experiments 1 and 2 (FIGS. 3 and 4). Table 3 summarizes the classification accuracies and positive predictive values (PPV) for comparing good, intermediate, and poor Oncotype DX scores via the multi-FOV framework using a combination of vascular density and architectural features over 10 trials of 3-fold cross-validation.

The entire algorithm, including object detection/segmentation, feature extraction, and classification, requires approximately 2 hours per slide on a 2.83 GHz processor. A key advantage of the multi-FOV approach is that computational time can be significant reduced via parallelization, especially with the rapid proliferation of multi-core CPU and GPU computing. For instance, individual FOV sizes (from all histological channels) can be processed in parallel since the class predictions they make are independent of each other.

TABLE 3

Classification accuracies and positive predictive values (PPV) for comparing good, intermediate, and poor Oncotype DX scores via the multi-FOV framework using a combination of vascular density and architectural features over 10 trials of 3-fold cross-validation

|  | Good vs. Poor | Good vs. Intermed. | Intermed. vs. Poor |
| --- | --- | --- | --- |
| Accuracy | 0.91 ± 0.022 | 0.76 ± 0.051 | 0.83 ± 0.076 |
| PPV | 0.94 ± 0.10 | 0.85 ± 0.11 | 0.92 ± 0.13 |

Example 5

Significance of Multi-FOV Classifier Compared to Individual FOV Sizes

This example demonstrates the significance of results obtained with the Multi-FOV classifier of the present invention.

Two-sample t-tests were performed with alternative hypotheses asserting that the multi-FOV classifier outperforms individual FOV sizes in terms of classification accuracy. The Bonferroni correction for multiple comparisons, as previously described in Bonferroni, C. E., "Il calcolo delle assicurazioni su gruppi di teste." In: Studi in Onore del Professore Salvatore Ortu Carboni, Rome (1935) 13-60, was applied to all p-values obtained. Table 4 summarizes the Bonferroni-corrected p-values produced by two-sided t-tests with a null hypothesis that classification results from the multi-FOV approach are equivalent to results from individual FOV sizes from both IHC stained and H & E stained histopathology slides. The alternative hypothesis asserts that the multi-FOV classifier performs better than individual FOV sizes. For good vs. poor outcome, we were able to reject the null hypothesis for all FOV sizes with p<0.05 for vascular density and for 3 of 4 FOV sizes for nuclear architecture. Similarly, the null hypothesis was rejected with p<0.05 for 3 of 4 FOV sizes when comparing good vs. intermediate outcomes and with p<0.10 for 2 of 4 FOV sizes when comparing intermediate vs. poor outcomes for nuclear architecture.

TABLE 4

Bonferroni-corrected p-values produced by two-sided t-tests with a null hypothesis that classification results from the multi-FOV approach are equivalent to results from individual FOV sizes from both IHC stained and H & E stained histopathology slides.

| Vascular Density in IHC Stained Histopathology | | | |
| --- | --- | --- | --- |
| FOV Size | Good vs. Poor | Good vs. Intermed. | Intermed. vs. Poor |
| 1000 | 0.0288 | 0.2250 | 0.9042 |
| 500 | 0.0123 | 0.1011 | 1.0000 |
| 250 | 0.0129 | 0.2313 | 0.1101 |
| Nuclear Architecture in H & E Stained Histopathology | | | |
| FOV Size | Good vs. Poor | Good vs. Intermed. | Intermed. vs. Poor |
| 2000 | 0.057 | 0.0666 | 1.0000 |
| 1000 | 0.0267 | 0.0066 | 0.1575 |
| 500 | 0.0429 | 0.0003 | 0.0657 |
| 250 | <0.0001 | <0.0001 | 0.0027 |

Example 6

Understanding Misclassified Patients in the Context of Oncotype DX as a Relative Ground Truth It is particularly important to note that the Oncotype DX RS values used as class labels in examples 2-5, represent a relative ground truth due to their demonstrated correlation with patient outcome. The classification results in these examples reveal the level of concordance between the multi-FOV framework and Oncotype DX RS values. Specifically, our results demonstrate the difficulty in using relative ground truth to evaluate BCa prognosis due to the high degree of uncertainty in the "intermediate" class. This problem is illustrated in FIG. 5, where only a few of the misclassified slides with intermediate RS fall squarely within the intermediate class (RS 22-29). Meanwhile, the majority of misclassifications lies on the lower end of the intermediate class (RS 18-21) and may actually represent patients with good prognosis.

The following is a disclosure by way of example of a computing device which may be used with the presently disclosed subject matter. The description of the various components of a computing device is not intended to represent any particular architecture or manner of interconnecting the components. Other systems that have fewer or more components may also be used with the disclosed subject matter. A communication device may constitute a form of a computing device and may at least include a computing device. The computing device may include an inter-connect (e.g., bus and system core logic), which can interconnect such components of a computing device to a data processing device, such as a processor(s) or microprocessor(s), or other form of partly or completely programmable or pre-programmed device, e.g., hard wired and or application specific integrated circuit ("ASIC") customized logic circuitry, such as a controller or microcontroller, a digital signal processor, or any other form of device that can fetch instructions, operate on pre-loaded/ pre-programmed instructions, and/or followed instructions found in hard-wired or customized circuitry to carry out logic operations that, together, perform steps of and whole processes and functionalities as described in the present disclosure.

In this description, various functions, functionalities and/or operations may be described as being performed by or caused by software program code to simplify description. However, those skilled in the art will recognize what is meant by such expressions is that the functions result from execution of the program code/instructions by a computing device as described above, e.g., including a processor, such as a microprocessor, microcontroller, logic circuit or the like. Alternatively, or in combination, the functions and operations can be implemented using special purpose circuitry, with or without software instructions, such as using Application-Specific Integrated Circuit (ASIC) or Field-Programmable Gate Array (FPGA), which may be programmable, partly programmable or hard wired. The application specific integrated circuit ("ASIC") logic may be such as gate arrays or standard cells, or the like, implementing customized logic by metalization(s) interconnects of the base gate array ASIC architecture or selecting and providing metalization(s) interconnects between standard cell functional blocks included in a manufacturers library of functional blocks, etc. Embodiments can thus be implemented using hardwired circuitry without program software code/instructions, or in combination with circuitry using programmed software code/instructions.

Thus, the techniques are limited neither to any specific combination of hardware circuitry and software, nor to any particular tangible source for the instructions executed by the data processor(s) within the computing device. While some embodiments can be implemented in fully functioning computers and computer systems, various embodiments are capable of being distributed as a computing device including, e.g., a variety of forms and capable of being applied regardless of the particular type of machine or tangible computer-readable media used to actually effect the performance of the functions and operations and/or the distribution of the performance of the functions, functionalities and/or operations.

The interconnect may connect the data processing device to define logic circuitry including memory. The interconnect may be internal to the data processing device, such as coupling a microprocessor to on-board cache memory or external (to the microprocessor) memory such as main memory, or a disk drive or external to the computing device, such as a remote memory, a disck farm or other mass storage device, etc. Commercially available microprocessors, one or more of which could be a computing device or part of a computing device, include a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68xxx series microprocessor from Motorola Corporation as examples.

The inter-connect in addition to interconnecting such as microprocessor(s) and memory may also interconnect such elements to a display controller and display device, and/or to other peripheral devices such as input/output (I/O) devices, e.g., through an input/output controller(s). Typical I/O devices can include a mouse, a keyboard(s), a modem(s), a network interface(s), printers, scanners, video cameras and other devices which are well known in the art. The inter-connect may include one or more buses connected to one another through various bridges, controllers and/or adapters. In one embodiment the I/O controller includes a USB (Universal Serial Bus) adapter for controlling USB peripherals, and/or an IEEE-1394 bus adapter for controlling IEEE-1394 peripherals.

The memory may include any tangible computer-readable media, which may include but are not limited to recordable and non-recordable type media such as volatile and non-volatile memory devices, such as volatile RAM (Random Access Memory), typically implemented as dynamic RAM (DRAM) which requires power continually in order to refresh or maintain the data in the memory, and non-volatile ROM (Read Only Memory), and other types of non-volatile memory, such as a hard drive, flash memory, detachable memory stick, etc. Non-volatile memory typically may include a magnetic hard drive, a magnetic optical drive, or an optical drive (e.g., a DVD RAM, a CD ROM, a DVD or a CD), or other type of memory system which maintains data even after power is removed from the system.

A server could be made up of one or more computing devices. Servers can be utilized, e.g., in a network to host a network database, compute necessary variables and information from information in the database(s), store and recover information from the database(s), track information and variables, provide interfaces for uploading and downloading information and variables, and/or sort or otherwise manipulate information and data from the database(s). In one embodiment a server can be used in conjunction with other computing devices positioned locally or remotely to perform certain calculations and other functions as may be mentioned in the present application.

At least some aspects of the disclosed subject matter can be embodied, at least in part, utilizing programmed software code/instructions. That is, the functions, functionalities and/or operations techniques may be carried out in a computing device or other data processing system in response to its processor, such as a microprocessor, executing sequences of instructions contained in a memory, such as ROM, volatile RAM, non-volatile memory, cache or a remote storage device. In general, the routines executed to implement the embodiments of the disclosed subject matter may be implemented as part of an operating system or a specific application, component, program, object, module or sequence of instructions usually referred to as "computer programs," or "software." The computer programs typically comprise instructions stored at various times in various tangible memory and storage devices in a computing device, such as in cache memory, main memory, internal or external disk drives, and other remote storage devices, such as a disc farm, and when read and executed by a processor(s) in the computing device, cause the computing device to perform a method(s), e.g., process and operation steps to execute an element(s) as part of some aspect(s) of the method(s) of the disclosed subject matter.

A tangible machine readable medium can be used to store software and data that, when executed by a computing device, causes the computing device to perform a method(s) as may be recited in one or more accompanying claims defining the disclosed subject matter. The tangible machine readable medium may include storage of the executable software program code/instructions and data in various tangible locations, including for example ROM, volatile RAM, non-volatile memory and/or cache. Portions of this program software code/instructions and/or data may be stored in any one of these storage devices. Further, the program software code/instructions can be obtained from remote storage, including, e.g., through centralized servers or peer to peer networks and the like. Different portions of the software program code/ instructions and data can be obtained at different times and in different communication sessions or in a same communication session.

The software program code/instructions and data can be obtained in their entirety prior to the execution of a respective software application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a single machine readable medium in entirety at any particular instance of time.

In general, a tangible machine readable medium includes any tangible mechanism that provides (i.e., stores) information in a form accessible by a machine (i.e., a computing device, which may be included, e.g., in a communication device, a network device, a personal digital assistant, a mobile communication device, whether or not able to download and run applications from the communication network, such as the Internet, e.g., an I-phone, Blackberry, Droid or the like, a manufacturing tool, or any other device including a computing device, comprising one or more data processors, etc.

In one embodiment, a user terminal can be a computing device, such as a in the form of or included within a PDA, a cellular phone, a notebook computer, a personal desktop computer, etc. Alternatively, the traditional communication client(s) may be used in some embodiments of the disclosed subject matter.

While some embodiments of the disclosed subject matter have been described in the context of fully functioning computing devices and computing systems, those skilled in the art will appreciate that various embodiments of the disclosed subject matter are capable of being distributed, e.g., as a program product in a variety of forms and are capable of being applied regardless of the particular type of computing device machine or computer-readable media used to actually effect the distribution.

The disclosed subject matter is described with reference to block diagrams and operational illustrations of methods and devices to provide a system and methods according to the disclosed subject matter. It is understood that each block of a block diagram or other operational illustration (herein collectively, "block diagram"), and combination of blocks in a block diagram, can be implemented by means of analog or digital hardware and computer program instructions. These computing device software program code/instructions can be provided to the computing device such that the instructions, which executed by the computing device, e.g., on a processor within the computing device or other data processing apparatus, such that, when so executed, the program software code/instructions cause the computing device to perform functions, functionalities and operations of a method(s) according to the disclosed subject matter, as recited in the accompanying claims, with such functions, functionalities and operations specified in the block diagram.

It will be understood that in some possible alternate implementations, the function, functionalities and operations noted in the blocks of a block diagram ay occur out of the order noted in the block diagram. For example, the function noted in two blocks shown in succession can in fact be executed substantially concurrently or the functions noted in blocks can sometimes be executed in the reverse order, depending upon the function, functionalities and operations involved. Therefore, the embodiments of methods presented and described as a flowchart(s) in the form of a block diagram in the present application are provided by way of example in order to provide a more complete understanding of the disclosed subject matter. The disclosed flow and concomitantly the method(s) performed as recited in the accompanying claims are not limited to the functions, functionalities and operations illustrated in the block diagram and/or logical flow presented therein. Alternative embodiments are contemplated in which the order of the various functions, functionalities and operations may be altered and in which sub-operations described as being part of a larger operation may be performed independently or performed differently than illustrated or not performed at all.

Although some of the drawings illustrate a number of operations in a particular order, functions, functionalities and/or operations which are not now known to be order dependent or become understood to not be order dependent may be reordered and other operations may be combined or broken out. While some reordering or other groupings may have been specifically mentioned in the present application, others will be or may become apparent to those of ordinary skill in the art and so the disclosed subject matter does not present an exhaustive list of alternatives. It should also be recognized that the aspects of the disclosed subject matter may be implemented in parallel or seriatim in hardware, firmware, software or any combination(s) thereof co-located or remotely located, at least in part, from each other, e.g., in arrays or networks of computing devices, over interconnected networks, including the Internet, and the like.

Equivalents

While the described invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the described invention. All such modifications are intended to be within the scope of the claims appended hereto.

What is claimed:

1. A method for analyzing a heterogenous image, using a multi-field-of-view (FOV) multi-parametric scheme, the method comprising:
   (a) inputting, via a computing device, a large heterogenous image;
   (b) generating, via the computing device, a plurality of FOVs at a first fixed FOV size from among a plurality of fixed FOV sizes;
   (c) producing, via the computing device, an aggregated multi-FOV decision for the large heterogenous image based on a first image parameter from among a plurality of image parameters, comprising:
      (i) producing a combined class decision for each of the plurality of FOVs at the first fixed FOV size based on the first image parameter, comprising:
         (1) extracting, via the computing device, the first image parameter describing a spatial arrangement of at least one object from each FOV at the first fixed FOV size;
         (2) training, via the computing device, a first classifier from among a plurality of classifiers identifying the first image parameter describing the spatial arrangement of the at least one object from each FOV at the first fixed FOV size;

(3) making, via the computing device, a first class decision for each FOV at the first fixed FOV size using a classification ensemble based on the first image parameter;

(4) combining, via the computing device, the first class decisions for each of the plurality of FOVs at the first fixed FOV size to yield the combined class decision for the plurality of FOVs at the first fixed FOV size; and (5) producing, via the computing device, the combined class decision for each of the plurality of FOVs at the first fixed FOV size based on the first image parameter;

(ii) repeating, via the computing device, the steps of extracting, training, making and combining for each of the plurality of fixed FOV sizes to generate a plurality of combined class decisions at respective ones of the plurality of fixed FOV sizes based on the first image parameter;

(iii) aggregating, via the computing device, the plurality of combined class decisions at the respective ones of the plurality of fixed FOV sizes based on the first image parameter to yield an aggregated multi-FOV decision, using a first multi-FOV classifier from among a plurality of multi-FOV classifiers, wherein the first multi-FOV classifier aggregates the plurality of combined class decisions that are outputs of the ensembles at each of the plurality of fixed FOV sizes based on the first image parameter; and (iv) producing the aggregated multi-FOV decision for the large heterogenous image based on the first image parameter.

2. The method according to claim 1, further comprising:

(d) producing an aggregated decision for the large heterogenous image based on a second image parameter from among the plurality of image parameters, comprising:

(i) producing a combined class decision for the plurality of FOVs at the first fixed FOV size based on the second image parameter, comprising:

(1) extracting, via the computing device, the second image parameter describing a spatial arrangement of at least one object from each FOV at the first fixed FOV size;

(2) training, via the computing device, a first classifier from among a plurality of classifiers, identifying the second image parameter that best describes the spatial arrangement for each FOV at the first fixed FOV size;

(3) making, via the computing device, a second class decision for each FOV at the first fixed FOV size using a classification ensemble based on the second image parameter;

(4) combining, via the computing device, the second class decisions for each of the plurality of FOVs at the first fixed FOV size to yield a combined class decision for the plurality of FOVs at the first fixed FOV size; and (5) producing, via the computing device, the combined class decision for each of the plurality of FOVs at the first fixed FOV size based on the second image parameter;

(ii) repeating, via the computing device, the steps of extracting, training, making and combining for each of the plurality of FOV sizes to generate a plurality of combined class decisions at each of the plurality of fixed FOV sizes based on the second image parameter;

(iii) aggregating, via the computing device, the plurality of combined class decisions at the respective ones of the plurality of fixed FOV sizes based on the second image parameter to yield an aggregated multi-FOV decision, using a first multi-FOV classifier from among a plurality of multi-FOV classifiers, wherein the second multi-FOV classifier aggregates the plurality of the combined class decisions that are outputs of the ensembles at each of the plurality of fixed FOV sizes based on the second image parameter; and (iv) producing the aggregated multi-FOV decision for the large heterogenous image based on the second image parameter;

(e) producing, via the computing device, a plurality of aggregated multi-FOV decisions for the large heterogenous image based on the plurality of image parameters using a plurality of multi-FOV classifiers;

(f) integrating, via the computing device, the aggregated multi-FOV decisions of steps (c), (d) or (e) to generate an integrated multi-parametric decision for the heterogenous image; using a multi-parametric classifier, wherein the multi-parametric classifier integrates the plurality of aggregated multi-FOV decisions that are outputs of the ensembles based on each of the plurality of image parameters, and (g) producing, via the computing device, the integrated multi-parametric decision for the heterogenous image.

3. The method according to claim 1, wherein the heterogenous image is a microscopic image.

4. The method according to claim 1, wherein the heterogenous image is a histopathologic image.

5. The method according to claim 1, wherein the heterogenous image is a histopathologic image of a diseased tissue.

6. The method according to claim 5, wherein the diseased tissue is selected from the group consisting of a cancer, an inflammatory disease, Crohn's disease, rheumatoid arthritis, microbial infections, and a combination thereof.

7. The method according to claim 6, wherein the cancer is selected from the group consisting of a prostate cancer, a breast cancer, a pancreatic cancer, a colon cancer, a leukemia, a lymphoma, a myeloma, an ovarian cancer, a melanoma, a lung cancer, a glioma, a renal-cell cancer, and a combination thereof.

8. The method according to claim 7, wherein the cancer is a breast cancer.

9. The method according to claim 8, wherein the breast cancer is characterized by at least one immunohistochemical (IHC) marker selected from the group consisting of estrogen receptor (ER), progesterone receptor (PR), HER2, CA 15-3, CA 27.29, CEA, ER, PgR, uPA, PAI-1, Ki-67, and a combination thereof.

10. The method according to claim 1, wherein the multi-FOV multi-parametric scheme obviates the need for a prior determination of optimal FOV size.

11. A system for analyzing a heterogenous image, using a multi-fields of view (FOVs) multi-parametric scheme via a computing device, comprising:

(a) a computing device configured to input an image;

(b) the computing device configured to generate a plurality of FOVs at a first fixed FOV size from among a plurality of fixed FOV sizes;

(c) the computing device configured to produce an aggregated multi-FOV decision for the large heterogenous image based on a first image parameter from among a plurality of image parameters, comprising:

(i) the computing device configured to produce a combined class decision for each of the plurality of FOVs at the first fixed FOV size based on the first image parameter, comprising:
  (1) the computing device configured to extract the first image parameter describing a spatial arrangement of at least one object from each FOV at the first fixed FOV size;
  (2) the computing device configured to train a first classifier from among a plurality of classifiers identifying the first image parameter describing the spatial arrangement of the at least one object from each FOV at the first fixed FOV size;
  (3) the computing device configured to make a first class decision for each FOV at the first fixed FOV size using a classification ensemble based on the first image parameter;
  (4) the computing device configured to combine the first class decisions for each of the plurality of FOVs at the first fixed FOV size to yield the combined class decision for the plurality of FOVs at the first fixed FOV size; and
  (5) the computing device configured to produce the combined class decision for each of the plurality of FOVs at the first fixed FOV size based on the first image parameter;
(ii) the computing device configured to repeat the steps of extracting, training, making and combining for each of the plurality of fixed FOV sizes to generate a plurality of combined class decisions at respective ones of the plurality of fixed FOV sizes based on the first image parameter;
(iii) the computing device configured to aggregate the plurality of combined class decisions at the respective ones of the plurality of fixed FOV sizes based on the first image parameter to yield an aggregated multi-FOV decision, using a first multi-FOV classifier from among a plurality of multi-FOV classifiers, wherein the first multi-FOV classifier aggregates the plurality of combined class decisions that are outputs of the ensembles at each of the plurality of fixed FOV sizes based on the first image parameter; and
(iv) the computing device configured to produce the aggregated multi-FOV decision for the large heterogenous image based on the first image parameter.

12. The system according to claim 11, further comprising:
(d) the computing device configured to produce an aggregated decision for the large heterogenous image based on a second image parameter from among the plurality of image parameters, comprising:
(i) the computing device configured to produce a combined class decision for the plurality of FOVs at the first fixed FOV size based on the second image parameter, comprising:
  (1) the computing device configured to extract the second image parameter describing a spatial arrangement of at least one object from each FOV at the first fixed FOV size;
  (2) the computing device configured to train a first classifier from among a plurality of classifiers to identify the second image parameter that best describes the spatial arrangement for each FOV at the first fixed FOV size;
  (3) the computing device configured to make a second class decision for each FOV at the first fixed FOV size using a classification ensemble based on the second image parameter;
  (4) the computing device configured to combine the second class decisions for each of the plurality of FOVs at the first fixed FOV size to yield a combined class decision for the plurality of FOVs at the first fixed FOV size; and
  (5) the computing device configured to produce the combined class decision for each of the plurality of FOVs at the first fixed FOV size based on the second image parameter;
(ii) the computing device configured to repeat the steps of extracting, training, making and combining for each of the plurality of FOV sizes to generate a plurality of combined class decisions at each of the plurality of fixed FOV sizes based on the second image parameter;
(iii) the computing device configured to aggregate the plurality of combined class decisions at the respective ones of the plurality of fixed FOV sizes based on the second image parameter to yield an aggregated multi-FOV decision, using a second multi-FOV classifier from among a plurality of multi-FOV classifiers, wherein the second multi-FOV classifier aggregates the plurality of combined class decisions that are outputs of the ensembles at each of the plurality of fixed FOV sizes based on the second image parameter; and
(iv) the computing device configured to produce the aggregated multi-FOV decision for the large heterogenous image based on the second image parameter;
(e) the computing device configured to produce a plurality of aggregated multi-FOV decisions for the large heterogenous image based on the plurality of image parameters using a plurality of multi-FOV classifiers;
(f) the computing device configured to integrate the aggregated multi-FOV decisions of steps (c), (d) or (e) to generate an integrated multi-parametric decision for the heterogenous image, using a multi-parametric classifier, wherein the second multi-parametric classifier interates outputs of the ensembles at each of the plurality of image parameters, and
(g) the computing device configured to produce the integrated multi-parametric decision for the heterogenous image.

13. The system according to claim 12, wherein the heterogenous image is a microscopic image.

14. The system according to claim 12, wherein the heterogenous image is a histopathologic image.

15. The system according to claim 12, wherein the heterogenous image is a histopathologic image of a diseased tissue.

16. The system according to claim 15, wherein the diseased tissue is selected from the group consisting of a cancer, an inflammatory disease, Crohn's disease, rheumatoid arthritis, microbial infections, and a combination thereof.

17. The system according to claim 16, wherein the cancer is selected from the group consisting of a prostate cancer, a breast cancer, a pancreatic cancer, a colon cancer, a leukemia, a lymphoma, a myeloma, an ovarian cancer, a melanoma, a lung cancer, a glioma, a renal-cell cancer, and a combination thereof.

18. The system according to claim 17, wherein the cancer is a breast cancer.

19. The system according to claim 18, wherein the breast cancer is characterized by at least one immunohistochemical (IHC) marker selected from the group consisting of estrogen receptor (ER), progesterone receptor (PR), HER2, CA 15-3, CA 27.29, CEA, ER, PgR, uPA, PAI-1, Ki-67, and a combination thereof.

20. The system according to claim 12, wherein the multi-FOV multi-parametric scheme obviates the need for a prior determination of optimal FOV size.

* * * * *